(12) United States Patent
Takeshima

(10) Patent No.: US 8,951,497 B2
(45) Date of Patent: Feb. 10, 2015

(54) METHOD AND APPARATUS FOR PRODUCING HYDROGEN

(75) Inventor: Shinichi Takeshima, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1163 days.

(21) Appl. No.: 12/855,236

(22) Filed: Aug. 12, 2010

(65) Prior Publication Data

US 2012/0039793 A1   Feb. 16, 2012

(51) Int. Cl.
 *C01B 3/08* (2006.01)
 *C01B 3/04* (2006.01)
 *C01B 13/02* (2006.01)

(52) U.S. Cl.
 CPC .............. *C01B 3/042* (2013.01); *C01B 13/0207* (2013.01); *C01B 13/0251* (2013.01); *C01B 2210/0046* (2013.01); *Y02E 60/364* (2013.01)
 USPC .......................................... 423/657; 423/658

(58) Field of Classification Search
 USPC .............. 423/644, 648.1, 652, 653, 654, 657, 423/658
 See application file for complete search history.

(56) References Cited

FOREIGN PATENT DOCUMENTS

| JP | A-07-144901 | 6/1995 |
|---|---|---|
| JP | A-07-267601 | 10/1995 |
| JP | A-10-87303 | 4/1998 |
| JP | A-2001-270701 | 10/2001 |
| JP | A-2005-199187 | 7/2005 |
| JP | A-2005-289680 | 10/2005 |

OTHER PUBLICATIONS

Charvin et al. "Two-step water splitting thermochemical cycle based on iron oxide redox pair for solar hydrogen production", 2007, energy 32, p. 1124-1133.*
Written Opinion of the International Searching Authority issued in International Patent Application No. PCT/JP2011/068405 dated Nov. 1, 2011 (with partial translation).
International Search Report issued in International Patent Application No. PCT/JP2011/068405 dated Nov. 1, 2011 (with translation).
Kaneko et al., "Rotary-Type Solar Reactor for Solar Hydrogen Production with Two-step Water Splitting Process," *Energy & Fuels*, vol. 21, No. 4, 2007, American Chemical Society.

(Continued)

*Primary Examiner* — Stanley Silverman
*Assistant Examiner* — Syed Iqbal
(74) *Attorney, Agent, or Firm* — Oliff PLC

(57) ABSTRACT

In the present invention, a method and apparatus for producing hydrogen by thermochemical water splitting are provided. The method for producing hydrogen of the present invention includes a reduction step of heating a high oxidation state redox material in an inert atmosphere to remove oxygen from the high oxidation state redox material, and thereby obtain a low oxidation state redox material and oxygen; and a hydrogen generation step of bringing water into contact with a low oxidation state redox material to oxidize the low oxidation state redox material and reduce the water, and thereby obtain a high oxidation state redox material and hydrogen. In the method for producing hydrogen of the present invention, the reduction step and the hydrogen generation step are performed switchingly in a same reaction vessel. Further, the apparatus for producing hydrogen of the present invention is used for performing the method for producing hydrogen of the present invention.

7 Claims, 1 Drawing Sheet

(56) References Cited

OTHER PUBLICATIONS

Zhu Xing et al., "Hydrogen Production by Two-Step Water-Splitting Thermochemical Cycle Based on Metal Oxide Redox System," Progress in Chemistry, vol. 22, No. 5, May 2010, 1010-1020.

Jul. 17, 2014 Office Action issued in Chinese Application No. 201180039128.3 (with English Translation).

* cited by examiner

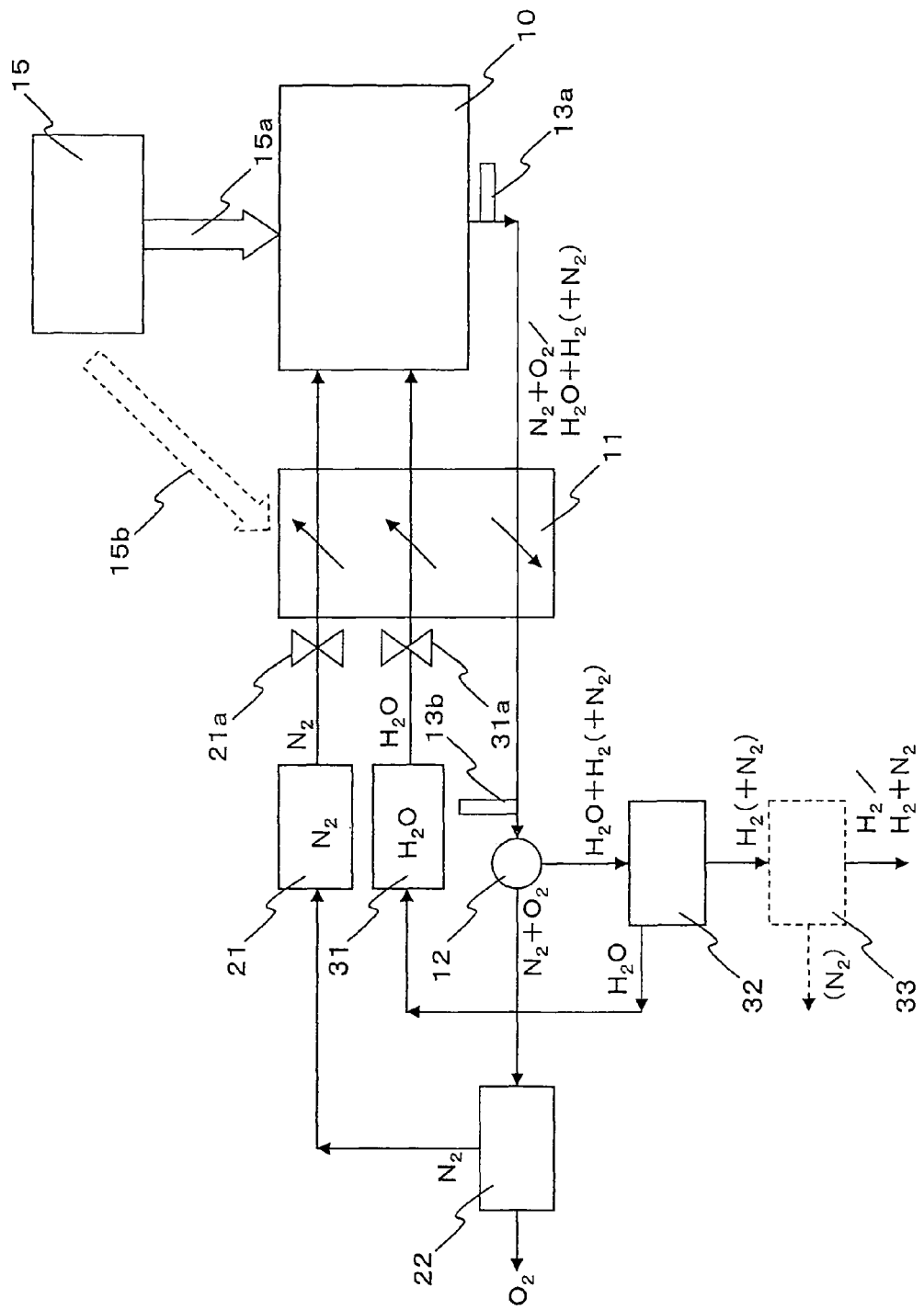

METHOD AND APPARATUS FOR PRODUCING HYDROGEN

TECHNICAL FIELD

The present invention relates to a method and apparatus for producing hydrogen, more particularly a method and apparatus for producing hydrogen by thermochemical water splitting.

BACKGROUND ART

In recent years, many proposals have been made for use of the clean energy hydrogen as an energy source. To produce hydrogen, steam reformation using a hydrocarbon fuel is the general practice. Further, in recent years, obtaining hydrogen from water by water splitting, in particular by thermochemical water splitting, has also been considered.

"Thermochemical water splitting" is the method of combining chemical reactions to cause the water splitting at a temperature lower than the case of direct heat decomposition of water. Specifically, for example, in thermochemical water splitting, in the following way, oxidation and reduction reactions between metal oxides differing in oxidation states are used to split water into hydrogen and oxygen ($M_{Red-Ox}$ means a redox material):

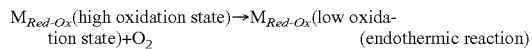

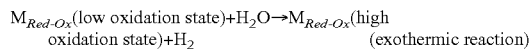

In such thermochemical water splitting, it has been proposed to divide the redox material into a plurality of parts, cause a reduction reaction at part of the redox material, and, during that time, cause an oxidation reaction at the other part of the redox material.

In relation to this, for example, H. Kaneko et al., "Rotary-Type Solar Reactor for Solar Hydrogen Production with Two-Step Water Splitting Process", Energy & Fuel (2007), 21, pp. 2287-2293, propose to divide the redox material into a plurality of parts, attach these to rotary mechanisms, and cause a reduction reaction at part of the redox material and, during that time, cause an oxidation reaction at the other part of the redox material.

Further, in relation to this, for example, in the system called the "DLR system" (Deutsches Zentrum fuer Luft-und Raumfahrt), it has been proposed to divide the redox material into two parts, cause a reduction reaction at one part of the redox material, and, during that time, cause an oxidation reaction at the other part of the redox material.

Note that, in relation to the hydrogen production and storage using thermochemical water splitting, use of oxidation and reduction reactions between metal oxides having different oxidation states, oxidation and reduction reactions between metal oxides and metals, etc. is generally known, as shown in the following literature.

In the water splitting method proposed in Japanese Unexamined Patent Publication (A) No. 2001-270701, metal zinc and magnetite are reacted with water to generate hydrogen as a reaction product. Further, the iron oxides obtained by this reaction are decomposed to generate oxygen as a product of the decomposition reaction.

In the hydrogen generation method proposed in Japanese Unexamined Patent Publication (A) No. 07-267601, water is reduced by a metal to generate hydrogen, the generated metal oxides are reduced by a reducing agent which is produced by an endothermic chemical reaction, and the resulting reducing agent is newly introduced into the reaction process. The endothermic reaction for generating the reducing agent is performed by supplying solar energy thereto.

The hydrogen generation facility proposed in Japanese Unexamined Patent Publication (A) No. 07-144901 comprises a reduction reaction apparatus for reducing iron-based oxides, and a hydrogen generation apparatus for bringing active oxide or metal iron into contact with steam to generate hydrogen. The reduction reaction apparatus is provided with a cooling apparatus, while the hydrogen generation apparatus is provided with a heating apparatus.

The apparatus for producing hydrogen proposed in Japanese Unexamined Patent Publication (A) No. 2005-289680 has a reducing means for causing hydrogen and metal oxides to react with each other so as to separate them into the metal and steam, a storing means for storing the metal separated by the reducing means, and an oxidizing means for causing the steam and the metal stored in the storing means to react with each other so as to separate them into hydrogen and metal oxides.

SUMMARY OF THE INVENTION

In the present invention, there are provided a method and apparatus for producing hydrogen by thermochemical water splitting.

(Method for Producing Hydrogen)

The method of the present invention for producing hydrogen by thermochemical water splitting includes a reduction step of heating a high oxidation state redox material in an inert atmosphere to remove oxygen from the high oxidation state redox material, and thereby obtain a low oxidation state redox material and oxygen; and a hydrogen generation step of bringing water into contact with a low oxidation state redox material to oxidize the low oxidation state redox material and reduce the water, and thereby obtain a high oxidation state redox material and hydrogen. Further, in this method of the present invention, the reduction step and the hydrogen generation step are performed switching in a same reaction vessel.

According to the method for producing hydrogen of the present invention, by performing the reduction step and hydrogen generation step switchingly in a reaction vessel, it is possible to have either of the reduction step or the hydrogen generation step constantly performed in the reaction vessel. Further, the time periods of the reduction step and hydrogen generation step can be flexibly adjusted in accordance with the times required for the reactions in the respective steps. Therefore, according to this hydrogen generation method of the present invention, it is possible to effectively utilize thermal energy supplied to the reaction vessel.

Note that, in general, the reaction time required by a reduction step is significantly longer than the reaction time required in a hydrogen generation step, and therefore in the method for producing hydrogen of the present invention, the time used for the reduction step can be made longer than the time used for the hydrogen generation step.

Further, the fact that, like in the method for producing hydrogen of the present invention, it is possible to flexibly adjust the times of the reduction step and hydrogen generation step in accordance with the times required by the reactions in the respective steps is particularly preferable, when adjustment of the thermal energy supplied to the reaction vessel is difficult, for example, when at least part of the thermal energy required by at least one of the reduction step and hydrogen generation step is supplied by solar energy.

In one aspect of the method for producing hydrogen of the present invention, the reduction step and hydrogen generation step are switched therebetween, based on an output value of an oxygen concentration sensor which evaluates outflow gas from the reaction vessel.

As explained above, in the reduction reaction of the redox material in the reduction step, the following reaction generates oxygen from the redox material in the reaction vessel ($M_{Red-Ox}$ indicates redox material):

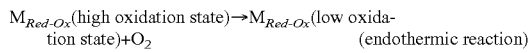

$M_{Red-Ox}$(high oxidation state)→$M_{Red-Ox}$(low oxidation state)+$O_2$   (endothermic reaction)

Therefore, while the reduction reaction in the reduction step is proceeding, the outflow gas from the reaction vessel contains oxygen, and this outflow gas becomes oxygen rich. Further, after that, when the reduction reaction in the reduction step is completed, the concentration of oxygen in the outflow gas from the reaction vessel falls, and, finally, this outflow gas substantially no longer contains oxygen. Accordingly, by evaluating the oxygen concentration of the outflow gas from the reaction vessel by an oxygen concentration sensor, it is possible to detect the progression and completion of the reduction reaction in the reduction step.

Further, as explained above, in the hydrogen generation reaction in the hydrogen generation step, hydrogen is generated from the redox material in the reaction vessel by the following reaction ($M_{Red-Ox}$ means redox material):

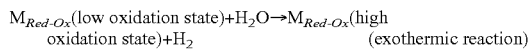

$M_{Red-Ox}$(low oxidation state)+$H_2O$→$M_{Red-Ox}$(high oxidation state)+$H_2$   (exothermic reaction)

Therefore, while the reduction reaction in the reduction step is proceeding, the output value of the oxygen concentration sensor shows that the outflow gas from the reaction vessel is a reducing atmosphere, or that the outflow gas does not contain oxygen. Further, after this, when the hydrogen generation reaction in the hydrogen generation step is completed, the concentration of hydrogen in the outflow gas from the reaction vessel falls, and thereby the degree of reducibility of the outflow gas falls; or in some cases part of the high oxidation state redox material decomposes, and releases oxygen. The drop in extent of reducibility of the outflow gas and any increase in the oxygen concentration can be detected by the oxygen sensor. Accordingly, by evaluating the outflow gas from the reaction vessel by the oxygen concentration sensor, it is possible to detect the progress and completion of the hydrogen generation reaction in the hydrogen generation step.

In the above way, by using the output value of the oxygen concentration sensor evaluating the outflow gas from the reaction vessel, it is possible to detect the progress and completion of the reduction reaction in the reduction step, and the progress and completion of the hydrogen generation reaction in the hydrogen generation step. Therefore, by switching between the reduction step and the hydrogen generation step based on the output value of the oxygen concentration sensor evaluating the outflow gas from the reaction vessel, it is possible to perform this switch at a suitable timing. Note that, this switch does not have to be performed after waiting for the reduction reaction or hydrogen generation reaction to proceed completely. It is sometimes desirable, in terms of the reaction speed, to perform this switch at the stage when the reduction reaction or hydrogen generation reaction has progressed.

Further, in one aspect of the method for producing hydrogen of the present invention, in the reduction step, the reaction vessel is supplied with inert gas, the inert gas is separated from the outflow gas from the reaction vessel, and further this inert gas is recirculated for use in the reduction step. The oxygen obtained from the outflow gas from the reaction vessel can be recovered, discarded, etc.

According to this aspect of the method for producing hydrogen of the present invention, the inert gas is recirculated for use in the reduction step, whereby the amount of inert gas required by addition becomes smaller.

Further, in one aspect of the method for producing hydrogen of the present invention, in the hydrogen generation step, the reaction vessel is supplied with water, the water is separated from the outflow gas from the reaction vessel, and, further, this water is recirculated for use in the hydrogen generation step. The hydrogen obtained from the outflow gas from the reaction vessel can be directly recovered, or can be recovered after further purification, etc.

According to this aspect of the method for producing hydrogen of the present invention, by recirculating the water for use in the hydrogen generation step, the amount of water required by addition becomes smaller.

In one aspect of the method for producing hydrogen of the present invention, in the hydrogen generation step, the reaction vessel is supplied with a combination of water and nitrogen as an inert gas, the outflow gas from the reaction vessel is separated into water, and a combination of hydrogen and nitrogen, the combination of hydrogen and nitrogen is adjusted to a molar ratio of hydrogen and nitrogen of 3:1 by removal of part of the nitrogen or addition of nitrogen, and further the combination of hydrogen and nitrogen adjusted in molar ratio is supplied to the ammonia production step.

According to this aspect of the method for producing hydrogen of the present invention, by supplying hydrogen and nitrogen in the state of a mixture to the ammonia production step, it is possible to reduce the energy required for separation of the hydrogen and nitrogen.

Further, in one aspect of the method for producing hydrogen of the present invention, heat exchange is performed between the outflow gas from the reaction vessel, and at least one of the inert gas and water supplied to the reaction vessel, the outflow gas from the reaction vessel is cooled, and at least one of the inert gas and water supplied to the reaction vessel is heated.

According to this aspect of the method for producing hydrogen of the present invention, by cooling the outflow gas from the reaction vessel, it is possible to promote the separation of the ingredients in the outflow gas in later steps. Further, by heating of at least one of the inert gas and water supplied to the reaction vessel, it is possible to reduce the amount of thermal energy required to be supplied to the reaction vessel for the oxidation and reduction reactions of the redox material.

(Apparatus for Producing Hydrogen)

The apparatus for producing hydrogen of the present invention comprises the following constituents: a reaction vessel holding a redox material; an inert gas supply unit supplying the reaction vessel with an inert gas; a water supply unit supplying the reaction vessel with water; an oxygen separation unit separating oxygen from reduction step outflow gas containing inert gas and oxygen from the reaction vessel; a water separation unit separating steam from the hydrogen generation step outflow gas containing steam and hydrogen from the reaction vessel; and a switching valve switchingly supplying reduction step outflow gas and hydrogen generation step outflow gas from the reaction vessel to the oxygen separation unit and steam separation unit.

Further, the apparatus for producing hydrogen of the present invention can have any of the following constitutions: an oxygen concentration sensor measuring an oxygen concentration of the reduction step outflow gas and hydrogen generation step outflow gas; an inert gas recirculation path recirculating inert gas obtained by separation at the oxygen separation unit to the inert gas supply unit; a water recirculation path recirculating water obtained by separation at the water separation unit to the water supply unit; a solar light collector supplying the reaction vessel with solar energy; and/or a heat exchanger exchanging heat between outflow gas from the reaction vessel, and at least one of the inert gas supplied from the inert gas supply unit to the reaction vessel and water supplied from the inert gas and water supply unit to the reaction vessel.

According to the apparatus for producing hydrogen of the present invention, it is possible to perform the method for producing hydrogen of the present invention.

BRIEF DESCRIPTION OF DRAWINGS

FIG. 1 is a view for explaining a specific example of production of hydrogen by the method and apparatus for producing hydrogen of the present invention.

EMBODIMENTS OF INVENTION

A specific example of hydrogen production by the method and apparatus for producing hydrogen of the present invention will be explained below with reference to FIG. 1.

(Reduction Step)

In the reduction step of the production of hydrogen by the method and apparatus for producing hydrogen of the present invention, nitrogen ($N_2$) is supplied as inert gas from an inert gas supply source (21) through a valve (21a) to a heat exchanger (11), heated therein, and further supplied to a reaction vessel (10). Together with the supply of this nitrogen ($N_2$), a high oxidation state redox material in the reaction vessel (10) is heated, oxygen is removed from the high oxidation state redox material, and thereby a low oxidation state redox material and oxygen are obtained. The oxygen ($O_2$) produced in the reaction vessel (10) in this way is removed from the reaction vessel (10), together with the nitrogen ($N_2$) supplied from an inert gas supply source (21), to the reaction vessel (10) ($N_2+O_2$), and is directed, through the heat exchanger (11) for cooling, to a switching valve (12).

The gas containing nitrogen and oxygen ($N_2+O_2$) is supplied to the oxygen separation unit (22) by the switching valve (12), the oxygen is removed at the oxygen separation unit (22), and the obtained nitrogen is optionally further purified to be again supplied to the inert gas supply source (21).

Note that, the heating of the reaction vessel (10) may be performed by a heat source (15), for example, a solar light collector, and the heat from this heat source (15), as shown by the arrow (15a), may be not only supplied to the reaction vessel (10), but also, as shown by the arrow (15b), may be optionally supplied to the heat exchanger (11).

(Hydrogen Generation Step)

In the hydrogen generation step for production of hydrogen by the method and apparatus for producing hydrogen of the present invention, water ($H_2O$) is supplied from a water supply source (31) through a valve (31a) to the heat exchanger (11), heated to be steam at the heat exchanger, and then supplied to the reaction vessel (10). As needed, together with the water ($H_2O$) from the water supply source (31), nitrogen ($N_2$) from the inert gas supply unit is supplied to the reaction vessel (10). This water ($H_2O$) is brought into contact with the low oxidation state redox material to oxidize the low oxidation state redox material and reduce the water, and thereby obtain a high oxidation state redox material and hydrogen ($H_2$). The hydrogen ($H_2$) generated at the reaction vessel (10) in this way is removed, together with the steam ($H_2O$) and optional nitrogen ($N_2$), from the reaction vessel (10) ($H_2O+O_2(+N_2)$), and is directed, through the heat exchanger (11) for cooling, to the switching valve (12).

At the switching valve (12), gas containing hydrogen, steam, and optional nitrogen ($H_2O+O_2(+N_2)$) is supplied to a water separation unit (32). By condensation of water, etc. at the water separation unit (32), the water is removed. The obtained water is optionally further purified, and again supplied to the water supply source (31). Further, the hydrogen and optional nitrogen ($H_2(+N_2)$) obtained at the water separation unit (32) can, in accordance with need, be treated at a nitrogen separation unit (33) to remove the nitrogen, and obtain hydrogen ($H_2$). Note that, the nitrogen ($N_2$) separated may be discarded, or may be optionally purified and again supplied to the inert gas supply source (21).

Further, in the removal of nitrogen at the nitrogen separation unit (33), the amount of the nitrogen removed may be adjusted such that the obtained product becomes a mixed gas containing hydrogen and nitrogen at a ratio of 3:1 ($H_2+N_2$). In this case, the obtained mixed gas of the hydrogen and nitrogen may be directly supplied to an ammonia synthesis step, in particular an ammonia synthesis step using the Haber-Bosch process. Further, in accordance with need, it is possible to add nitrogen to obtain a mixed gas containing hydrogen and nitrogen in a ratio of 3:1 ($H_2+N_2$).

(Switching Between Reduction Step and Hydrogen Generation Step)

In the production of hydrogen by the method and apparatus for producing hydrogen of the present invention, when switching between the reduction step and hydrogen generation step is based on an output value of an oxygen concentration sensor evaluating the outflow gas from a reaction vessel, the oxygen concentration sensor may be placed near an outlet (13a) from the reaction vessel (10), and/or near an inlet (13b) of the switching valve (12) etc.

(Redox Material)

In the present invention, a material to be oxidized and reduced for thermochemical water splitting is referred to as a "redox material". As the oxidation and reduction reactions for such thermochemical water splitting, it is possible to use the oxidation and reduction reactions between a metal and metal oxide, or the oxidation and reduction reactions between metal oxides having different oxidation states.

An example of such oxidation and reduction reactions is given by the following reaction formulas; and oxidation and reduction reactions between magnesium (Mg), aluminum (Al), iron (Fe), and other metals, and metal oxides thereof are utilized in this method (M is a metal element, and m is an atomic value of the metal element M).:

$$M + H_2O \to M_{2/m}O + H_2 \quad \text{(formula 2)}$$

$$M_{2/m}O \to M + \tfrac{1}{2}O_2 \quad \text{(formula 3)}$$

Total reaction $H_2O \to H_2 + \tfrac{1}{2}O_2$

Further, another example of such oxidation and reduction reactions is given by the following reaction formulas; oxidation and reduction reactions between iron oxides having different oxidation states are utilized in this method:

$$3FeO + H_2O \to Fe_3O_4 + H_2 \quad \text{(formula 4)}$$

$$Fe_3O_4 \to 3FeO + \tfrac{1}{2}O_2 \quad \text{(formula 5)}$$

Total reaction $H_2O \to H_2 + \tfrac{1}{2}O_2$

The metals and/or metal oxides used in this thermochemical water splitting utilizing the oxidation and reduction reactions of metals and/or metal oxides can be carried as fine powder on a carrier of a fin type structure, honeycomb type structure, pellet type structure, etc. In this case, it becomes possible to suppress sintering of the metal and/or metal oxides used, and thereby maintain a relatively large surface area.

(Inert Gas)

In the present invention, as the inert gas, argon, helium, or another rare gas, as well as nitrogen, may be used. In particular, nitrogen obtained by deep cooling air separation may be used.

(Oxygen Concentration Sensor)

As the oxygen concentration sensor used in the present invention, an electromotive force type oxygen concentration sensor, in particular an electromotive force type oxygen concentration sensor used for stoichiometric control of exhaust gas in exhaust gas purification applications of automobiles etc. may be mentioned. The electromotive force type oxygen concentration sensor generally has a sensor part comprised of a test tube shaped zirconia element coated on its surface with platinum. By exposing the inner surface of this sensor part to the air, and exposing the outer surface to the exhaust gas, when the difference in oxygen concentration between the inner surface side of the zirconia element of the sensor part and the outer surface side is large, electromotive force is generated.

That is, in the method and apparatus for producing hydrogen of the present invention, when the outflow gas from the reaction vessel contains oxygen, the electromotive force generated in this electromotive force type oxygen concentration sensor is small or no electromotive force is generated. Further, when the outflow gas from the reaction vessel does not substantially contain oxygen, the electromotive force generated at this electromotive force type oxygen concentration sensor becomes larger.

However, in the method for producing hydrogen of the present invention, as the oxygen concentration sensor, not only an electromotive force type oxygen concentration sensor, but also a limiting current type oxygen concentration sensor may be used. Further, in the method and apparatus for producing hydrogen of the present invention, the oxygen concentration sensor may be used combined with a hydrogen concentration sensor.

(Solar Light Collector)

As the solar light collector able to be used in the present invention, a parabolic dish type light collector, solar tower type light collector, parabolic trough type light collector, etc. may be mentioned.

Specifically, a parabolic dish type light collector is a light collector having a dish shaped reflection part reflecting and focusing sunlight, and a light receiving unit receiving the focused light. The light collecting degree of this light collector is high, and therefore high temperature heat source is obtained. Further, a solar tower type light collector is a light collector having a plurality of heliostats reflecting and focusing sunlight (reflection unit), and a light receiving unit arranged at the top of the light receiving tower. The light collecting degree of this light collector is high, and therefore a high temperature heat source is obtained. Furthermore, the parabolic trough type light collector is a light collector having a trough type reflection unit reflecting and focusing sunlight, and a light receiving unit receiving the focused light. The light collecting degree of this light collector is relatively low, and therefore the obtained heat source is a low temperature heat source, but compared with the above two light collectors, the cost is low.

In each of these light collectors, the reflection unit may be covered by aluminum or another reflective material.

(Others)

The reaction vessel used in the present invention may be any vessel able to hold a redox material. Further, the inert gas supply unit and water supply unit used in the present invention may respectively be tanks able to hold inert gas and water. Further, the oxygen separation unit, water separation unit, and nitrogen separation unit used in the present invention may respectively be any parts able to separate oxygen, water, and nitrogen. Therefore, these separation units can have separation membranes suitable for separation of these substances, can perform condensation to enable separation of these substances, can perform deep cooling separation, etc.

Further, the switching valve used in the present invention may be any switching valve which can supply reduction step outflow gas and hydrogen generation step outflow gas from the reaction vessel to the oxygen separation unit and steam separation unit by switching. Further, the inert gas recirculation path used in the present invention may be any flow path enabling recirculation of the inert gas obtained at the oxygen separation unit to the inert gas supply unit. Further, the water recirculation path used in the present invention may be any flow path enabling recirculation of the water obtained at the water separation unit to the water supply unit. Further, the heat exchanger used in the present invention may be any heat exchanger enabling heat exchange between the inert gas and/or water supplied to the reaction vessel, and the outflow gas from the reaction vessel. Therefore, it may be a counter flow type heat exchanger, or may be a parallel flow type heat exchanger.

The invention claimed is:

1. A method for producing hydrogen, comprising:
   a reduction step of heating a high oxidation state redox material in an inert atmosphere to remove oxygen from the high oxidation state redox material, and thereby obtain a low oxidation state redox material and oxygen; and
   a hydrogen generation step of bringing water into contact with the low oxidation state redox material to oxidize the low oxidation state redox material and reduce the water, and thereby obtain the high oxidation state redox material and hydrogen;
   wherein the reduction step and the hydrogen generation step are switchingly performed in a same reaction vessel.

2. A method according to claim 1, wherein the reduction step and hydrogen generation step are switched therebetween based on an output value of an oxygen concentration sensor evaluating outflow gas from the reaction vessel.

3. A method according to claim 1, wherein in said reduction step, the reaction vessel is supplied with inert gas, the inert gas is separated from an outflow gas from the reaction vessel, and the inert gas is recirculated for use in the reduction step.

4. A method according to claim 1, wherein, in the hydrogen generation step, the water is supplied to the reaction vessel, the water is separated from an outflow gas from the reaction vessel, and the separated water is recirculated for use in the hydrogen generation step.

5. A method according to claim 1, wherein, in the hydrogen generation step, a combination of the water and nitrogen as the inert gas are supplied to the reaction vessel, the water and a combination of hydrogen and nitrogen are separated from each other in an outflow gas from the reaction vessel, the combination of hydrogen and nitrogen is adjusted to a molar ratio of hydrogen and nitrogen of 3:1 by removal of part of the nitrogen or by addition of nitrogen, and the combination of hydrogen and nitrogen adjusted in molar ratio is supplied to an ammonia production step.

6. A method according to claim 1, wherein at least part of a thermal energy required for at least one of the reduction step and hydrogen generation step is supplied by solar thermal energy.

7. A method according to claim 1, wherein heat exchange is performed between an outflow gas from the reaction vessel and at least one of the inert gas and the water supplied to the reaction vessel such that the outflow gas from the reaction vessel is cooled and at least one of the inert gas and the water supplied to the reaction vessel is heated.

* * * * *